US012666027B2

(12) United States Patent (10) Patent No.: US 12,666,027 B2
Ye et al. (45) Date of Patent: Jun. 23, 2026

(54) SYSTEMS AND METHODS FOR BLEND INTRA MODE CODING

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 254 days.

(21) Appl. No.: 18/474,523

(22) Filed: Sep. 26, 2023

(65) Prior Publication Data

US 2024/0380889 A1    Nov. 14, 2024

Related U.S. Application Data

(60) Provisional application No. 63/465,451, filed on May 10, 2023.

(51) Int. Cl.
H04N 19/132 (2014.01)
H04N 19/105 (2014.01)
H04N 19/176 (2014.01)

(52) U.S. Cl.
CPC ......... H04N 19/132 (2014.11); H04N 19/105 (2014.11); H04N 19/176 (2014.11)

(58) Field of Classification Search
None
See application file for complete search history.

(56) References Cited

U.S. PATENT DOCUMENTS

2012/0140821 A1*    6/2012    Drugeon .............. H04N 19/182
375/E7.243
2017/0374379 A1    12/2017    Chen et al.
(Continued)

FOREIGN PATENT DOCUMENTS

WO    WO 2022218285 A1    10/2022
WO    2023050072 A1    4/2023

OTHER PUBLICATIONS

Tencent Technology, ISR/WO, PCT/CN2023/033886, Feb. 6, 2024, 19 pgs.
(Continued)

*Primary Examiner* — Chikaodili E Anyikire
(74) *Attorney, Agent, or Firm* — Morgan, Lewis & Bockius LLP

(57) ABSTRACT

The various implementations described herein include methods and systems for encoding and decoding video. In one aspect, a method of video decoding includes receiving video data comprising a plurality of blocks, including a first block, from a video bitstream, where the first block is encoded in one of a plurality of smooth modes. The method also includes identifying a set of reference samples for the first block and deriving a first prediction value for the first block, where the first prediction value is derived from a second prediction value, the second prediction value is derived without a division or shift operation, and a final step in deriving the first prediction value comprises a division or shift operation. The method further includes decoding the first block using the first prediction value.

20 Claims, 10 Drawing Sheets

(56) References Cited

U.S. PATENT DOCUMENTS

| | | | | |
|---|---|---|---|---|
| 2018/0316918 | A1 | 11/2018 | Drugeon et al. | |
| 2019/0124342 | A1* | 4/2019 | Young | H04N 19/45 |
| 2019/0200012 | A1 | 6/2019 | Lee et al. | |
| 2020/0204826 | A1 | 6/2020 | Rath et al. | |
| 2020/0228800 | A1 | 7/2020 | Joshi et al. | |
| 2020/0336739 | A1 | 10/2020 | Choi et al. | |
| 2021/0297663 | A1 | 9/2021 | Jiang et al. | |
| 2022/0141459 | A1* | 5/2022 | Sarwer | H04N 19/132 |
| | | | | 375/240.02 |
| 2022/0329781 | A1 | 10/2022 | Filippov et al. | |
| 2022/0377341 | A1 | 11/2022 | Zhu et al. | |
| 2022/0377367 | A1 | 11/2022 | Liu et al. | |
| 2022/0417497 | A1 | 12/2022 | Zhao et al. | |
| 2023/0007299 | A1 | 1/2023 | Zhao et al. | |
| 2023/0056211 | A1 | 2/2023 | Wang | |
| 2023/0319267 | A1 | 10/2023 | Wang | |
| 2025/0063180 | A1* | 2/2025 | Yoo | H04N 19/105 |

OTHER PUBLICATIONS

Jonathan Pfaff et al., "Intra Prediction and Mode Coding in VVC", IEEE Transactions on Circuits and Systems for Video Technology, 15 pgs.

Liang Zhao et al., "Improved Intra Coding Beyond AV1 Using Adaptive Prediction Angles and Reference Lines", IEEE International Conference on Image Processing (ICIP), Abu Dhabi, United Arab Emirates, Sep. 2020, 3 pgs.

Liang Zhao et al., "Wide Angular Intra Prediction for Versatile Video Coding", IEEE, 2019 Data Compression Conference (DCC), Snowbird, UT, USA, 2019, 3 pgs.

Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.

Xin Zhao et al., "Study on Coding Tools Beyond AV1," 2021 IEEE International Conference on Multimedia and Expo (ICME), Shenzhen, China, 2021, 6 pgs.

Xin Zhao et al., "Tool Description for AOMedia Video Model (AVM)", Document: CWG-B100_v1, Alliance for Open Media Codec Working Group, Jan. 3, 2022, 52 pgs.

Yao-Jen Chang et al., "Intra Prediction Using Multiple Reference Lines for the Versatile Video Coding Standard", Proceedings of the SPIE, Applications of Digital Image Processing XLII, 1113716, Sep. 2019, 1 pg.

Yize Jin et al., "Improved Intra Mode Coding Beyond AV1", Acoustics Speech and Signal Processing (ICASSP) ICASSP 2021—2021 IEEE International Conference on, 5 pgs.

Yue Chen et al., "An Overview of Core Coding Tools in the AV1 Video Codec", 2018 IEEE Picture Coding Symposium, San Francisco, CA, USA, 5 pgs.

Luc N. Trudeau et al., "Predicting Chroma from Luma in AV1", 2018 Data Compression Conference, 2018 IEEE, 9 pgs.

Tencent Technology, ISRWO of 7801-WO, PCT/CN2023/033887, Jan. 8, 2024, 14 pgs.

Tencent Technology, ISRWO of 7906-WO, PCT/CN2023/033888, Jan. 8, 2024, 18 pgs.

Shohei Matsuo et al., "Intra Angular Prediction with Weight Function and Modification Filter", 2013 Picture Coding Symposium (PCS), Dec. 2013, 4 pgs.

* cited by examiner

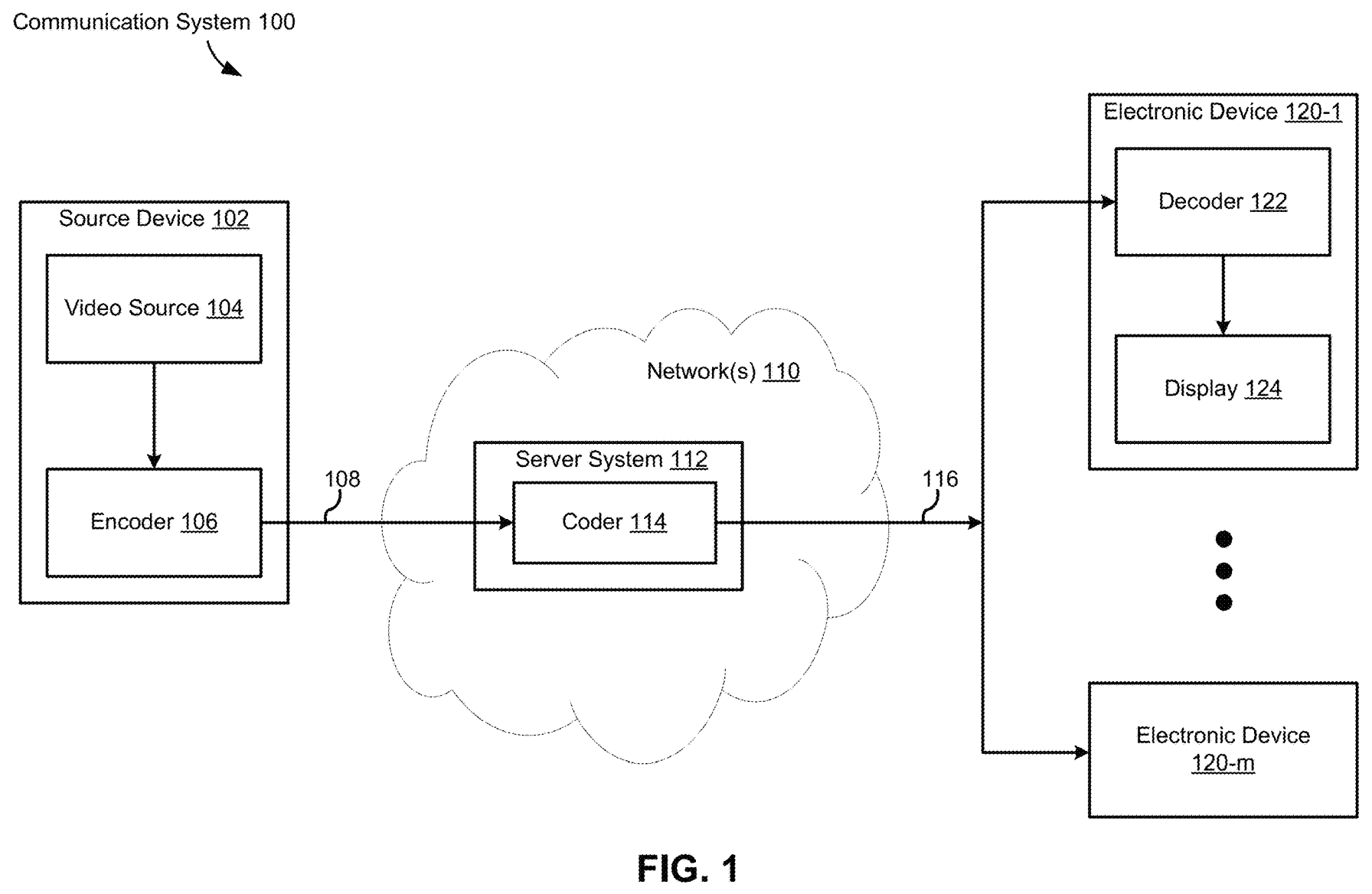

Communication System 100

Electronic Device 120-1

Decoder 122

Display 124

Electronic Device 120-m

116

Network(s) 110

Server System 112

Coder 114

108

Source Device 102

Video Source 104

Encoder 106

FIG. 1

SPLIT_TT_HOR

SPLIT_TT_VER

SPLIT_BT_HOR

SPLIT_BT_VER

404

406

400

402

R | R
R | R

R | R
R | R

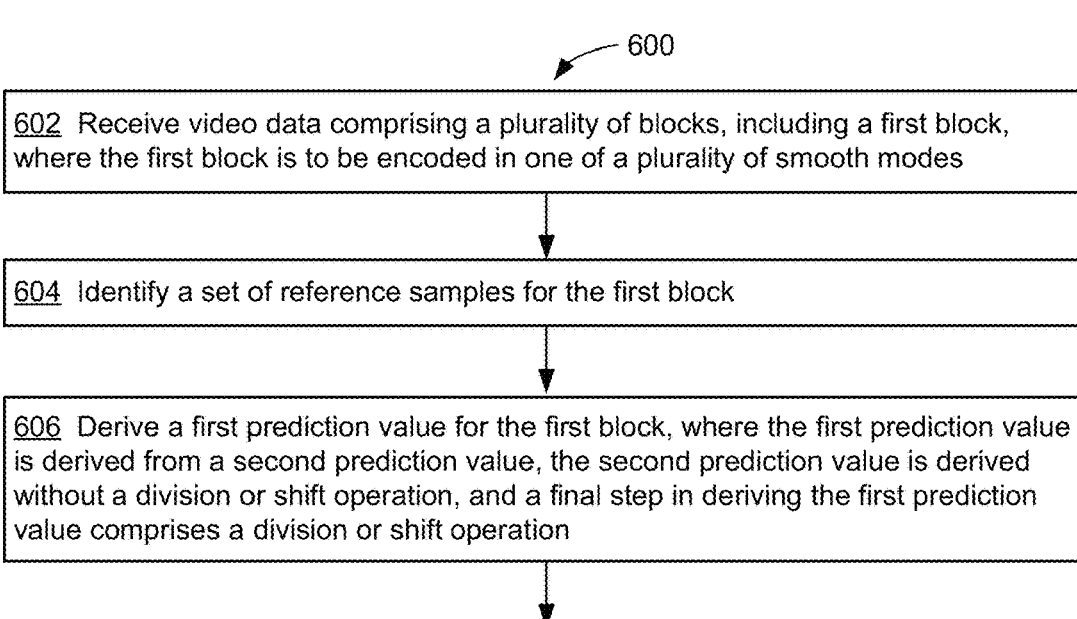

600

602  Receive video data comprising a plurality of blocks, including a first block, where the first block is to be encoded in one of a plurality of smooth modes 604  Identify a set of reference samples for the first block 606  Derive a first prediction value for the first block, where the first prediction value is derived from a second prediction value, the second prediction value is derived without a division or shift operation, and a final step in deriving the first prediction value comprises a division or shift operation 608  Encode the first block based on the first prediction value

FIG. 6A

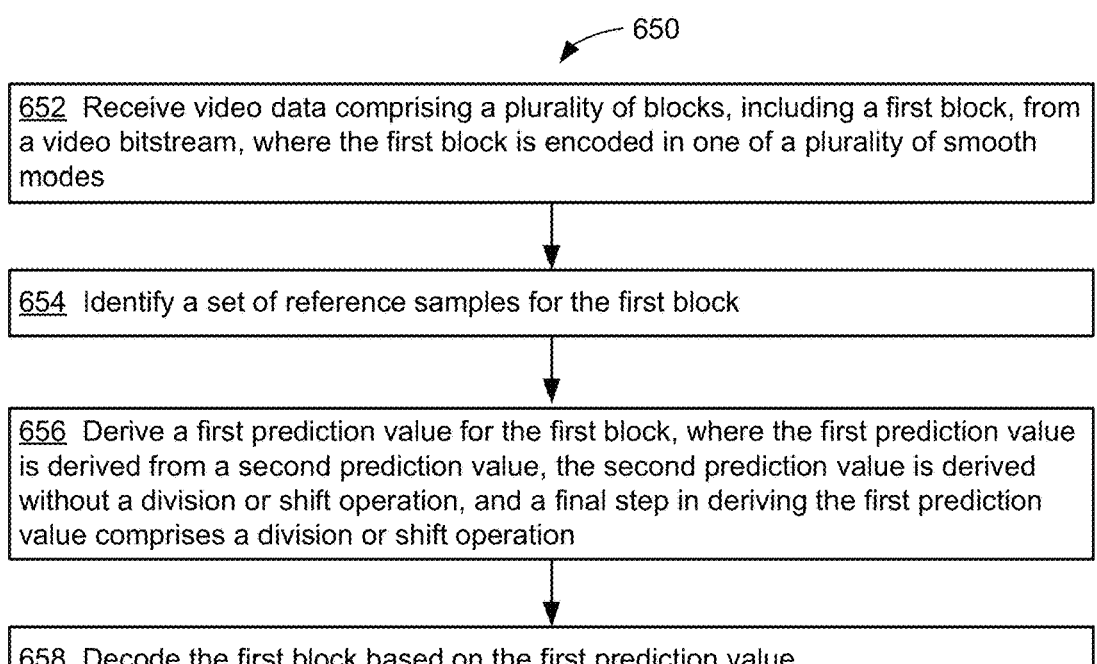

650

652  Receive video data comprising a plurality of blocks, including a first block, from a video bitstream, where the first block is encoded in one of a plurality of smooth modes 654  Identify a set of reference samples for the first block 656  Derive a first prediction value for the first block, where the first prediction value is derived from a second prediction value, the second prediction value is derived without a division or shift operation, and a final step in deriving the first prediction value comprises a division or shift operation 658  Decode the first block based on the first prediction value

FIG. 6B

SYSTEMS AND METHODS FOR BLEND INTRA MODE CODING

RELATED APPLICATIONS

This application claims priority to U.S. Provisional Patent Application No. 63/465,451, entitled "Blend Mode in Intra Mode Coding" filed May 10, 2023, which is hereby incorporated by reference in its entirety.

TECHNICAL FIELD

The disclosed embodiments relate generally to video coding, including but not limited to systems and methods for blend mode predictions for video encoding/decoding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As described in more detail below, smooth prediction modes (e.g., SMOOTH-B, SMOOTH-H, and SMOOTH-V in AV1) in current systems do not account for the uneven distribution of available reference samples (e.g., only top and left reference samples may be available). The systems and methods described herein improve prediction accuracy by biasing (weighting) the prediction using top and left reference samples. Additionally, the prediction derivations described herein may eliminate intermediate division operations (e.g., division is only performed when deriving the final predictor). Moving the division operations to the back end of the process can improve precision during the calculations and can also simplify the hardware. Additionally, as described below, the prediction derivations may incorporate right shift operations which can further improve the precision of the calculations.

In accordance with some embodiments, a method of video decoding is provided. The method includes (i) receiving video data comprising a plurality of blocks, including a first block, from a video bitstream, where the first block is encoded in one of a plurality of smooth modes (e.g., a SMOOTH-B, SMOOTH-H, or SMOOTH-V mode); (ii) identifying a set of reference samples for the first block; (iii) deriving a first prediction value for the first block, where the first prediction value is derived via a linear interpolation function involving a first reference sample of the set of reference samples and a height and a width of the first block; and (iv) decoding the first block based on the first prediction value.

In accordance with some embodiments, a method of video encoding is provided. The method includes (i) receiving video data comprising a plurality of blocks, including a first block, where the first block is to be encoded in one of a plurality of smooth modes; (ii) identifying a set of reference samples for the first block; (iii) deriving a first prediction value for the first block, where the first prediction value is derived via a linear interpolation function involving a first reference sample of the set of reference samples and a height and a width of the first block; and (iv) encoding the first block based on the first prediction value.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder component).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A is a flow diagram illustrating an example method of encoding video in accordance with some embodiments.

FIG. 6B is a flow diagram illustrating an example method of decoding video in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
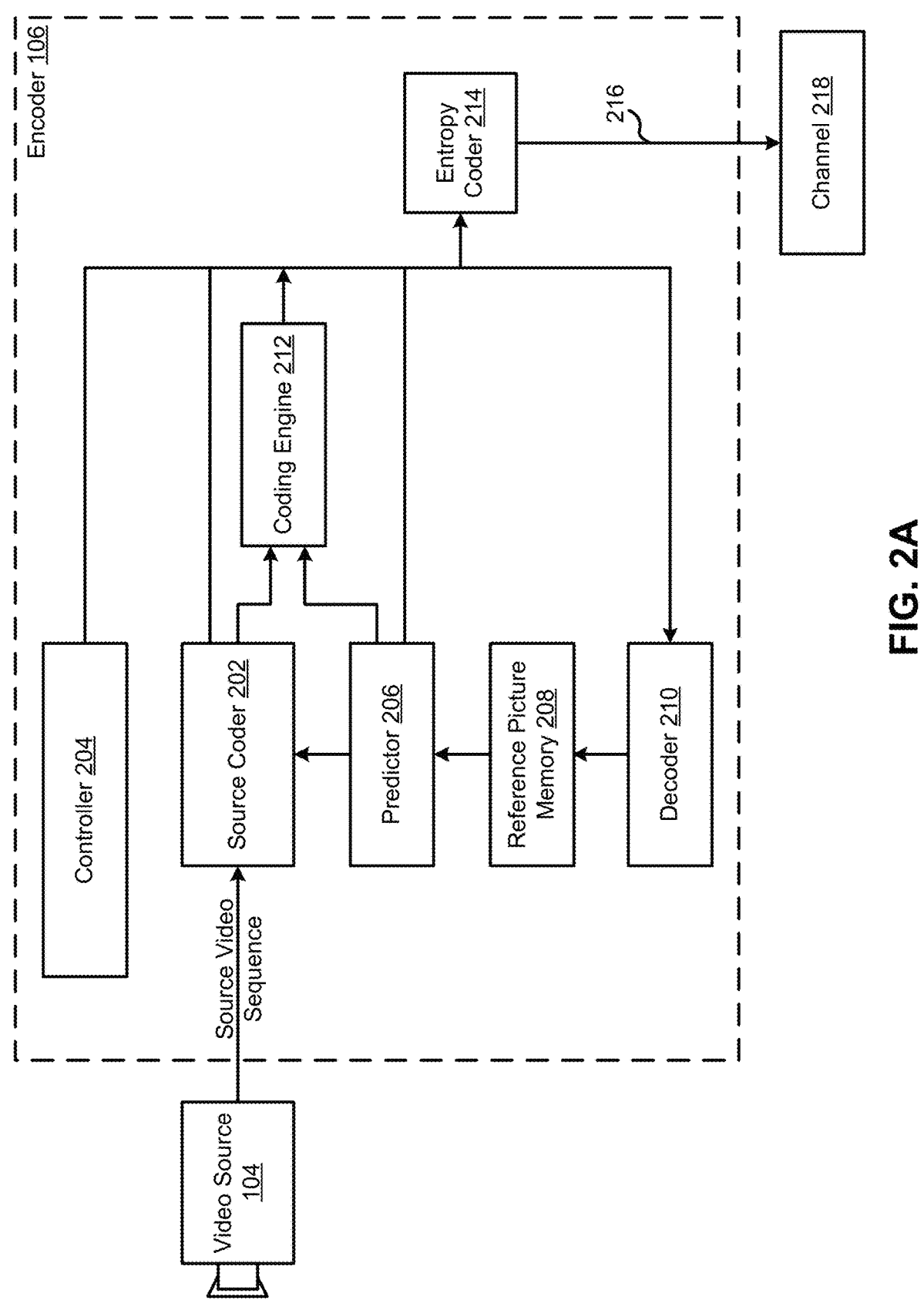
FIG. 2A is a block diagram illustrating example elements of an encoder component in accordance with some embodiments.

The present disclosure describes, among other things, new smooth prediction modes that can improve prediction accuracy (as compared to previous smooth modes) by biasing predictions using top and/or left reference samples. For example, to predict a sample in a current block using spatially neighboring reference samples, a horizontal prediction value $P_H$ may be derived, then a refined horizontal prediction value $P_H'$ is derived using a weighted sum of a left reference sample and $P_H$. As another example, a vertical prediction value $P_V$ is derived, then a refined horizontal prediction value $P_V'$ is derived using weighted sum of a top reference sample and $P_V$. In this way, coding accuracy can be improved (e.g., reducing artifacts in the decoded video) as compared to the other smooth prediction modes. The present disclosure also describes, when calculating the prediction samples for the new smooth (blend) modes, applying all the division operations in the last step of the derivation (e.g., only performing division when deriving a refined/ combined predictor). Moving the division operations to the end of the process improves precision during the calculations and may also simplify the hardware.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies. Only in certain areas is a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
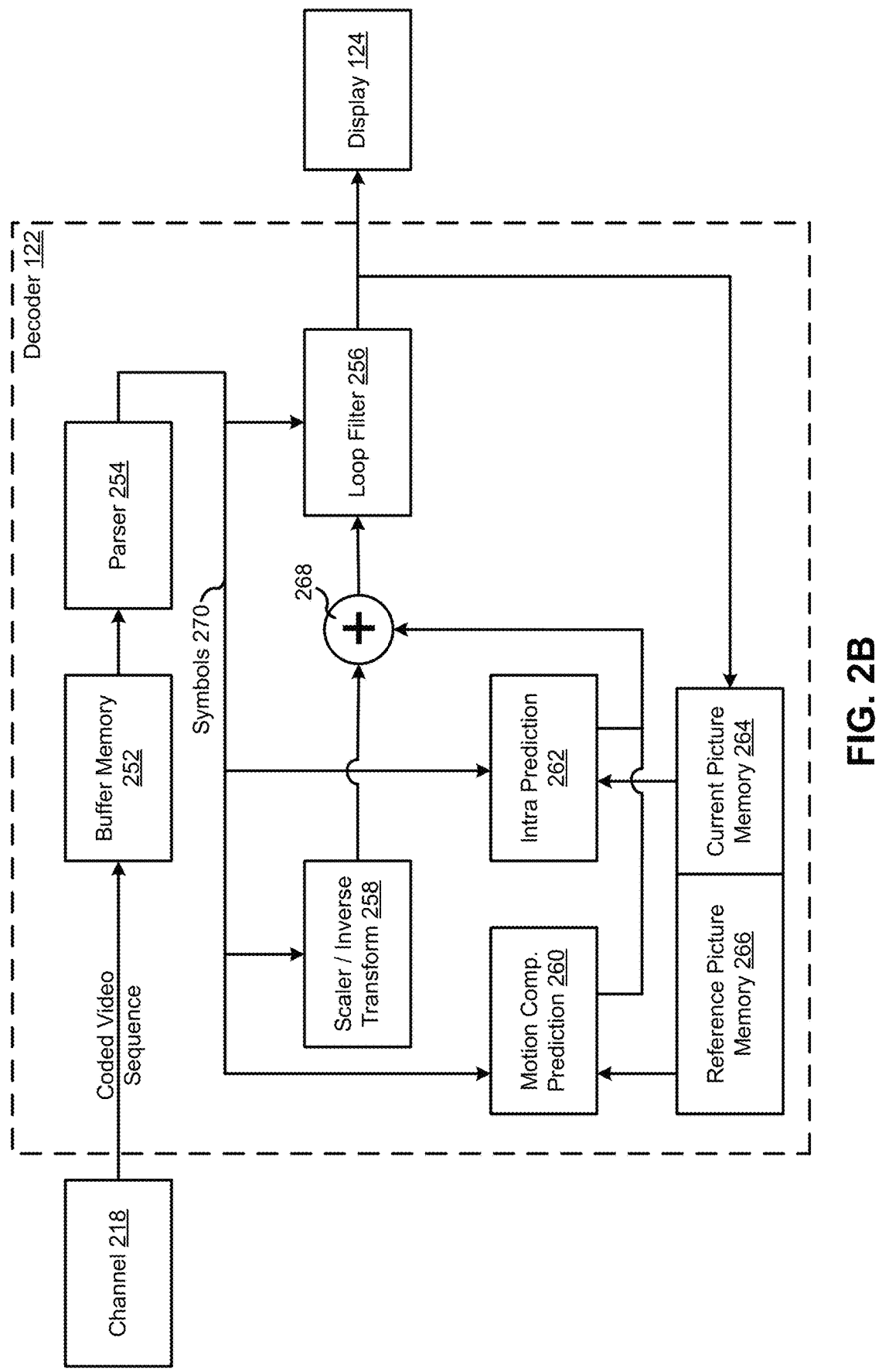
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
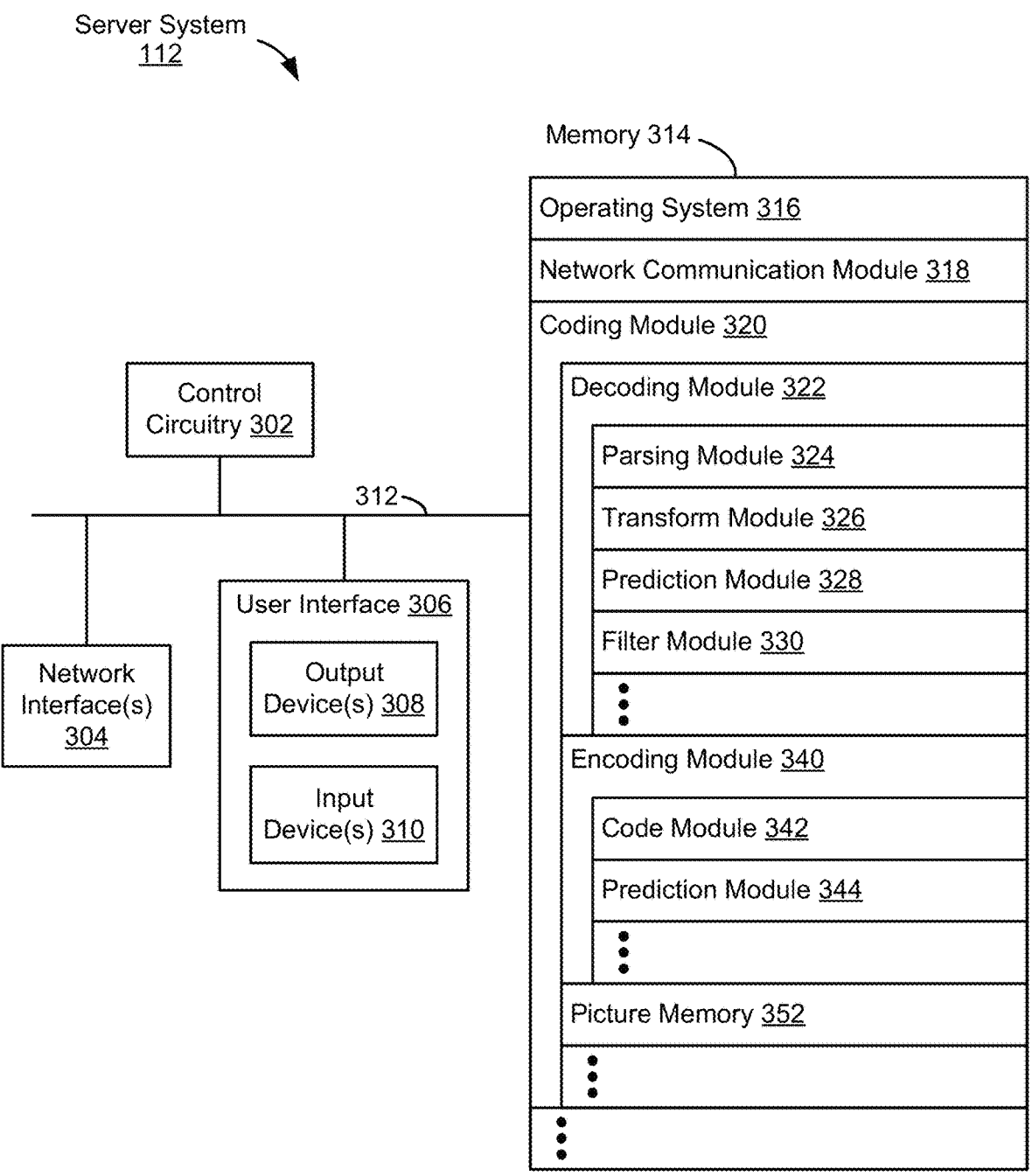
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

Figures 4A, 4B, 4C, 4D:
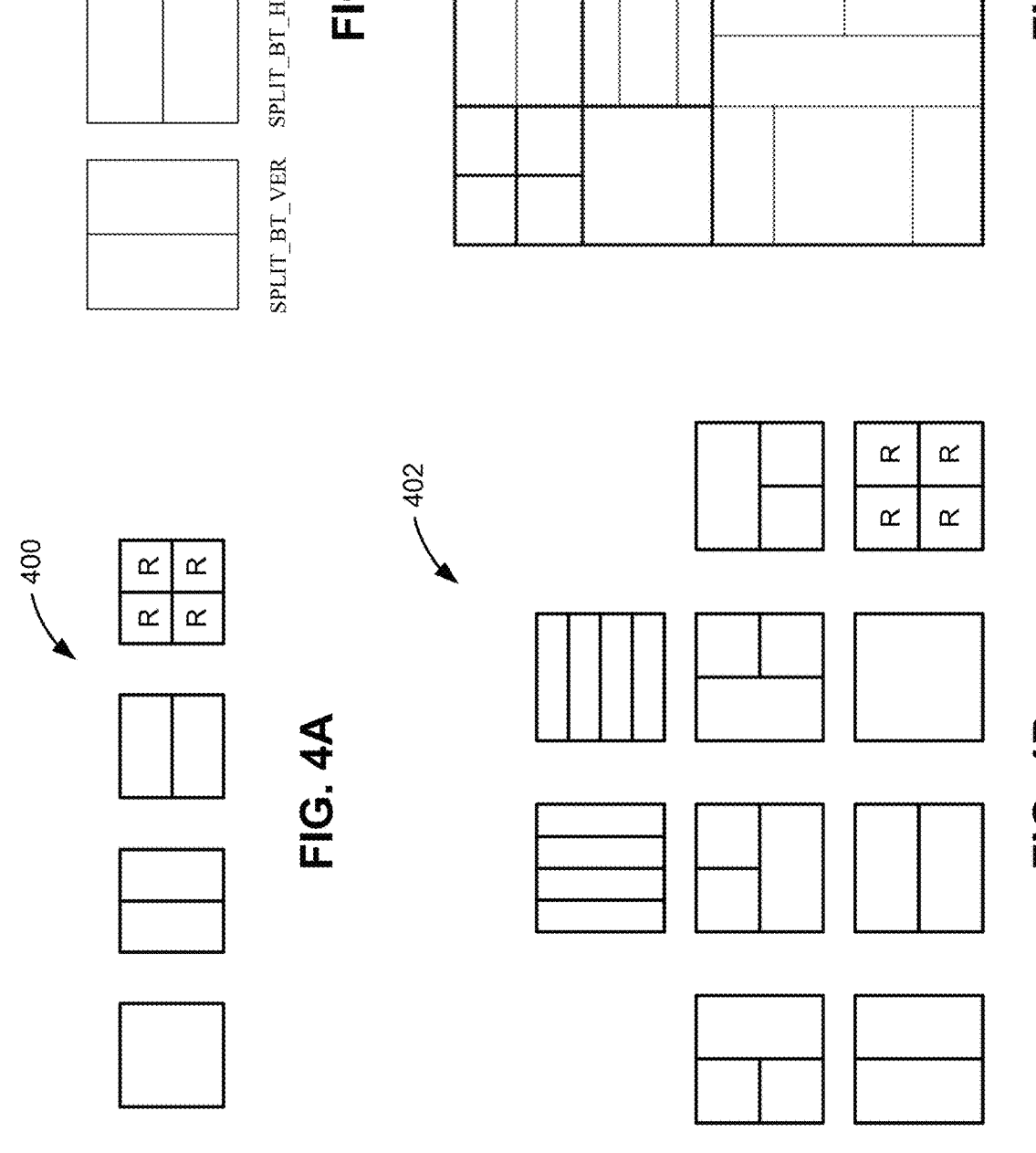
FIGS. 4A-4D illustrate example coding tree structures in accordance with some embodiments.

The coding processes and techniques described below may be performed at the devices and systems described above (e.g., the source device 102, the server system 112, and/or the electronic device 120). FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (also referred to as quadtree) structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An example of block partitions for one CTU (406) is shown in FIG. 4D, which illustrates an example quadtree with nested multi-type tree coding block structure.

Figure 5A:
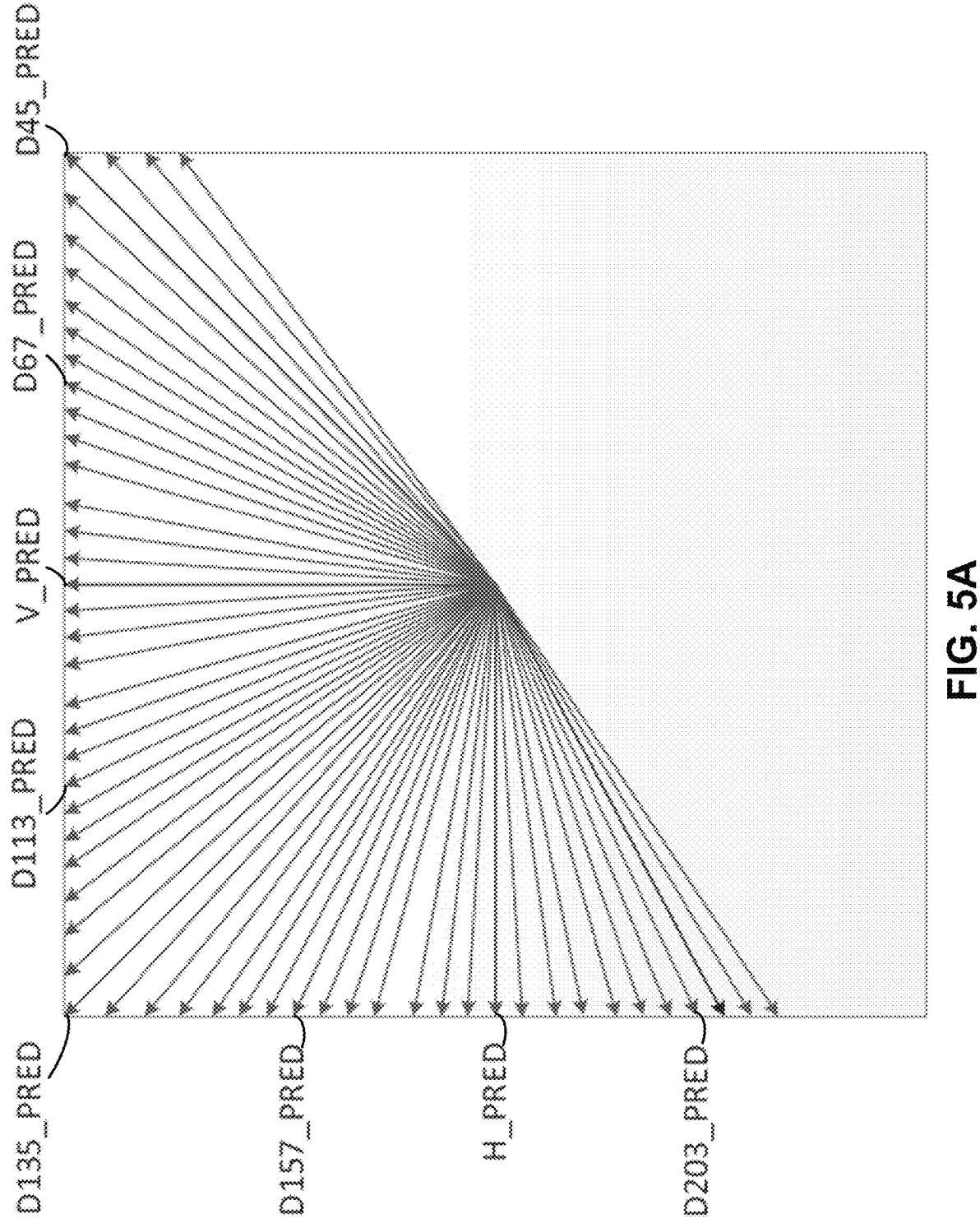
FIG. 5A shows an example of directional intra prediction mode angles in accordance with some embodiments.

For directional intra prediction, some approaches support 8 directional modes corresponding to angles from 45 to 207 degrees. To exploit more varieties of spatial redundancy in directional textures, directional intra modes may be extended to an angle set with finer granularity. For example, the 8 angles may be denoted as nominal angles. The 8 nominal angles, named V_PRED, H_PRED, D45_PRED, D135_PRED, D113_PRED, D157_PRED, D203_PRED, and D67_PRED, are shown in FIG. 5A. As also shown in FIG. 5A, for each nominal angle, there may be 7 finer angles for a total of 56 directional angles. A prediction angle may be described by a nominal intra angle plus an angle delta (e.g., −3~3 multiplied by a step size of 3 degrees). To implement directional prediction modes in a generic way, the 56 directional intra prediction mode may be implemented with a unified directional predictor that projects each pixel to a reference sub-pixel location and interpolates the reference pixel by a 2-tap bilinear filter. This directional intra prediction is also sometimes called single directional intra prediction.

In some approaches, a lookup table is used to map each intra prediction angle to horizontal and vertical offsets between each pixel in the current block and the reference samples. The offsets in the lookup table may be the integer value of the tangent of the angle multiplied by 64 for each intra prediction angle. For example, 64 is equal to the tangent (45°) multiplied by 64, where the tangent (45°) is equal to 1. For example, the associated offsets are 64 for 45-degree intra prediction angle, and the horizontal offset between each pixel in current block and reference pixel is increased by 1 pixel as the row number of the pixel increases by 1.

Figure 5B:
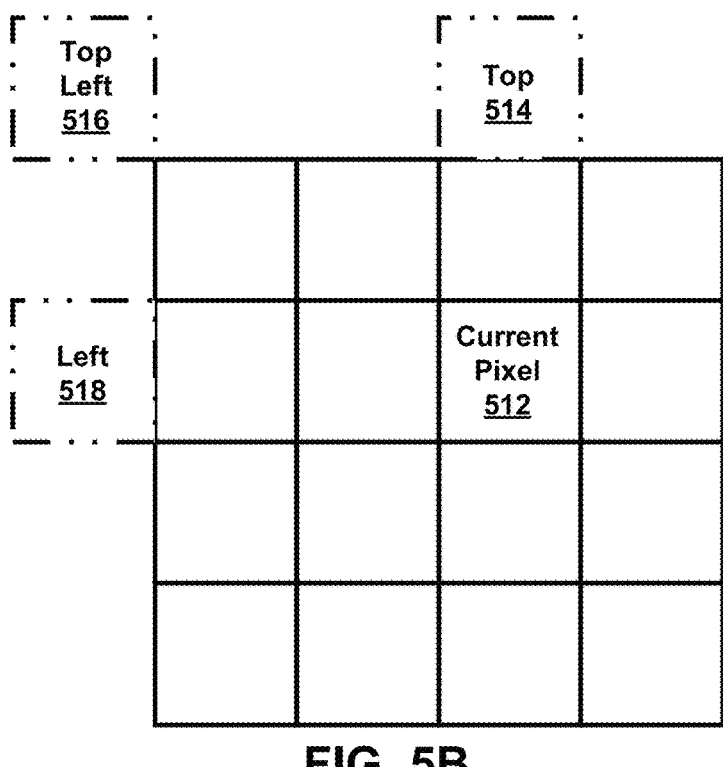
FIGS. 5B-5C show example reference samples for a current block in accordance with some embodiments.

In some approaches, there are also non-directional smooth intra prediction modes, e.g., DC, PAETH, SMOOTH-B (sometimes denoted as SMOOTH), SMOOTH-V, and SMOOTH-H. For a DC prediction, the average of the left and above neighboring samples may be used as the predictor of the block to be predicted. For a PAETH prediction, top, left, and top-left reference samples may be fetched, and the value which is closest to a given value (e.g., top+left—top-left) is set as the predictor for the pixel to be predicted. FIG. 5B illustrates the positions of a top sample 514, a left sample 518, and a top-left sample 516 for a current pixel (or patch or subblock) in a current block. For SMOOTH-B, SMOOTH-V, and SMOOTH-H modes, the block may be predicted using quadratic interpolation in vertical or horizontal directions, or an average of both directions.

To capture decaying spatial correlation with references on the edges, filter intra modes may be used for luma blocks. In some approaches, five filter intra modes are defined with each being represented by a set of eight 7-tap filters, which reflect the correlation between pixels in a 4×2 patch (subblock) and the 7 neighbors adjacent to it. In this way, the weighting factors for the 7-tap filter are position dependent.

Figure 5C:
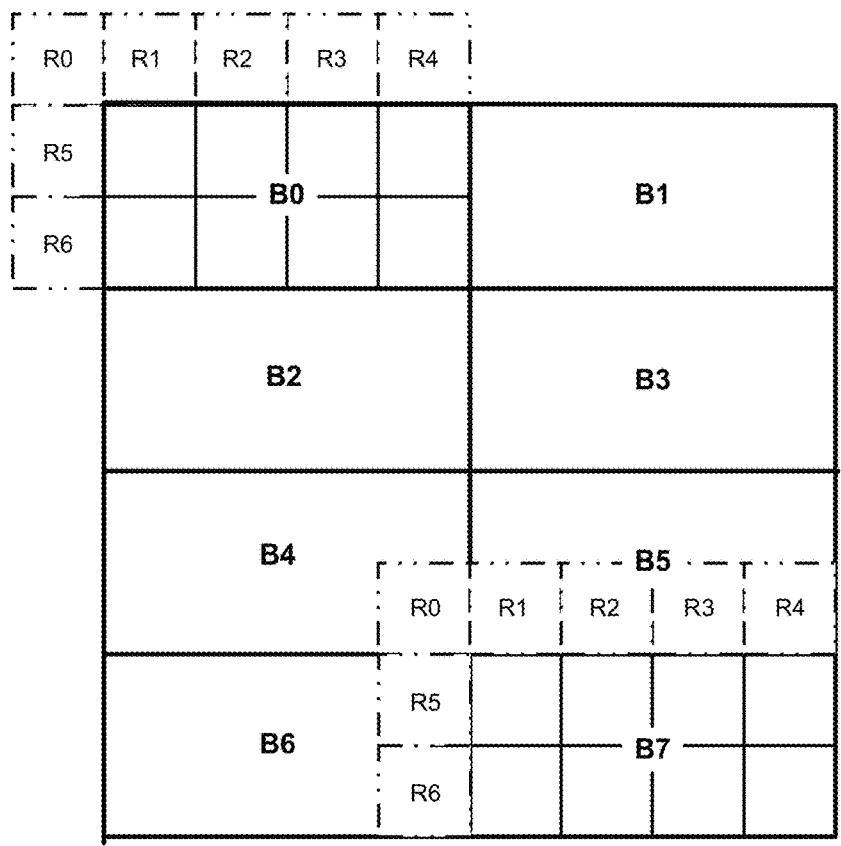

For example, for an 8×8 block may be split into 8 4×2 patches as illustrated in FIG. 5C. The patches are indicated by B0, B1, B2, B3, B4, B5, B6, and B7 in FIG. 5C. For each patch, the 7 neighbors (indicated by R0-R7) are used to predict the pixels in the current patch. For patch B0, all the neighbors are already reconstructed. But for other patches, some of the neighbors may not be reconstructed. In that case, the predicted values of immediate neighbors may be used as the reference. For example, all the neighbors of patch B7 may not be reconstructed, so the prediction samples of neighbors (e.g., B5 and B6) are used instead.

In some approaches, the SMOOTH-V and SMOOTH-H modes generate prediction values by using interpolation along the vertical and horizontal directions, respectively, while the SMOOTH-B mode generates prediction values using an average of the interpolation results along both directions. The top, left, top-right, and bottom-left neighboring reconstructed sample values may be denoted as T, L, TR and BL, respectively. The prediction sample values in the three modes may be calculated as follows, SMOOTH–H mode $$P_H(x, y) = w(x) \times L + (1 - w(x)) \times TR \qquad \text{Equation 1}$$

SMOOTH–V mode $$P_V(x, y) = w(y) \times T + (1 - w(y)) \times BL \qquad \text{Equation 2}$$

Figure 5D:
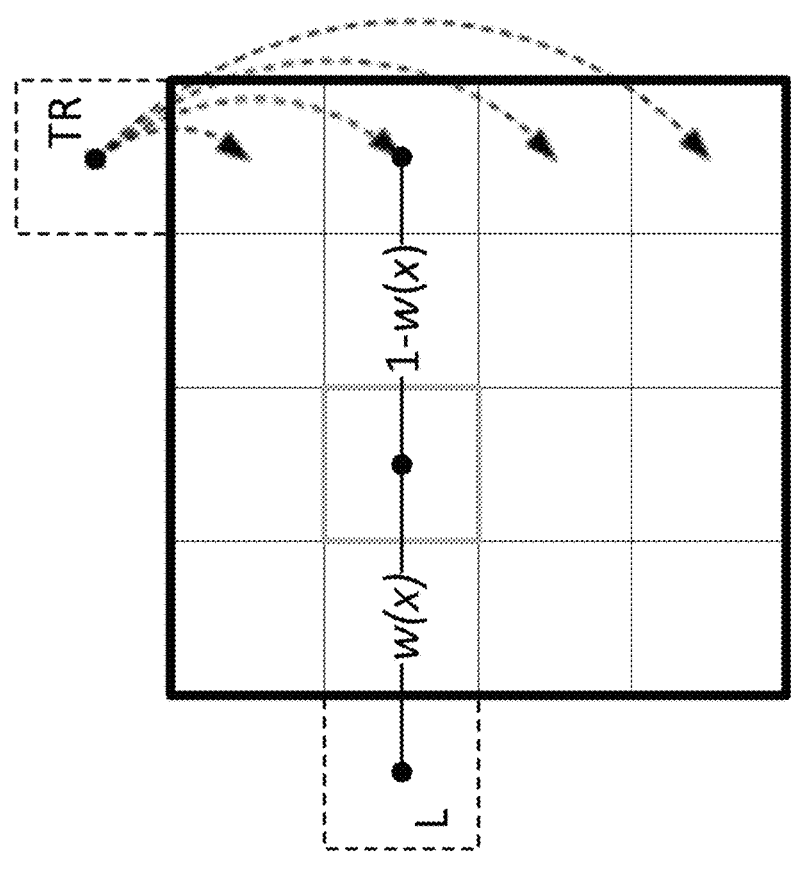
FIG. 5D shows example weighting for smooth modes in accordance with some embodiments.
Figure 5D:
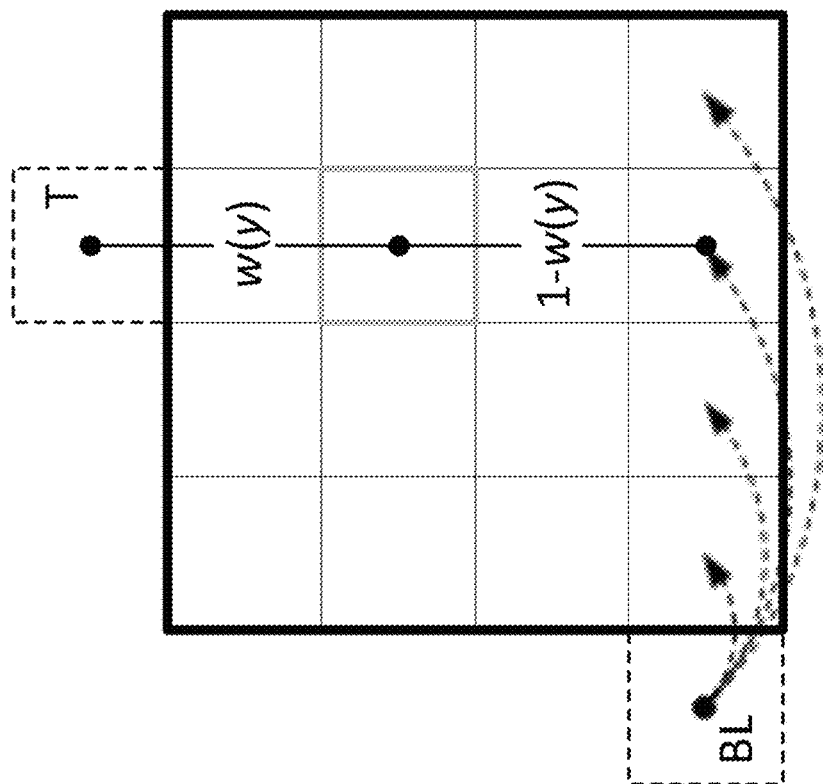

SMOOTH–B mode $$P(x, y) = (P_H(x, y) + P_V(x, y))/2 \qquad \text{Equation 3}$$

where x denotes the horizontal coordinate of a prediction sample in a prediction block, y denotes the vertical coordinate of a prediction sample in a prediction block, w(x) and w(y) are weighting values derived based on the coordinate values, and $P_H$, $P_V$ and P denote the prediction block of the SMOOTH-H, SMOOTH-V and SMOOTH-B mode, respectively. FIG. 5D illustrates the prediction process of the SMOOTH-V and SMOOTH-H modes, where w(y) and w(x) are non-linear weighting values derived based on the vertical coordinate and horizontal coordinate in the SMOOTH-V and SMOOTH-H mode, respectively. The weights may be stored in a lookup table.

In some systems, the smooth prediction modes (e.g., the SMOOTH-B, SMOOTH-H, and SMOOTH-V modes above), do not take into account the uneven distribution of available reference samples (e.g., only the top and left reference samples may be available) or non-linear weighting distribution of available reference samples, therefore the prediction accuracy of these smooth modes may be reduced as compared to modes that are weighted more heavily to the top and left reference samples. The systems and methods described below can improve the prediction accuracy and precision as compared to the smooth prediction modes shown in Equations 1-3 above. The methods and processes described below may be used separately or combined in any order. In the description below, if a mode generates prediction samples according to a given prediction direction, the mode referred to as a directional mode.

Figure 5E:
FIG. 5E shows example reference samples for a current block in accordance with some embodiments.

As used herein, the left reference samples refer to reference samples that are located with a vertical coordinate value within the minimum and maximum vertical coordinate values of the current block (e.g., current block 522) as shown by the left section 528 in FIG. 5E. The top reference samples refer to reference samples that are located with a horizontal coordinate value within the minimum and maximum horizontal coordinate values of the current block as shown by the top section 524 in FIG. 5E. The bottom-left reference samples refer to reference samples that are located with a vertical coordinate value greater than the maximum vertical coordinate values of the current block as shown by the bottom-left section 530 in FIG. 5E. The top-right reference samples refer to reference samples that are located with a horizontal coordinate value greater than the maximum horizontal coordinate values of the current block as shown by the top-right section 526 in FIG. 5E. The top-left reference samples refer to reference samples that are located with a horizontal coordinate value less than the minimum horizontal coordinate values of the current block and a vertical coordinate value less than the minimum vertical coordinate values of the current block as shown by the top-left section 532 in FIG. 5E.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a plurality of blocks, including a first block, where the first block is to be encoded in one of a plurality of smooth modes (e.g., SMOOTH-B, SMOOTH-V, or SMOOTH-H). The system identifies (604) a set of reference samples for the first block. The system derives (606) a first prediction value (e.g., a combined prediction value) for the first block, where (i) the first prediction value is derived from a second prediction value (e.g., a horizontal or vertical prediction value), (ii) the second prediction value is derived without a division or shift operation, and (iii) a final step in deriving the first prediction value comprises a division or shift operation (e.g., using Equation 13, 18, or 19 below). The system encodes (608) the first block based on the first prediction value. For example, the system reconstructs the first block based on the first prediction value, evaluates the smooth mode based on the reconstructed first block, and selects the smooth mode for encoding the first block in accordance with the evaluation (e.g., the smooth mode has a lowest error).

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks, including a first block, from a video bitstream, where the first block is encoded in one of a plurality of smooth modes (e.g., SMOOTH-B, SMOOTH-V, or SMOOTH-H). The system identifies (654) a set of reference samples for the first block. The system derives (656) a first prediction value for the first block (e.g., a combined prediction value), where (i) the first prediction value is derived from a second prediction value (e.g., a horizontal or vertical prediction value), (ii) the second prediction value is derived without a division or shift operation, and (iii) a final step in deriving the first prediction value comprises a division or shift operation (e.g., using Equation 13, 18, or 19 below). The system decodes (658) the first block based on the first prediction value.

Although FIGS. 6A and 6B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In some embodiments, to predict a sample in the current block using spatially neighboring reference samples, a horizontal prediction value $P_H$ is first derived, then a refined horizontal prediction value $P'_H$ is derived using a weighted sum of a left reference sample (e.g., the reference sample with the same vertical coordinate) and $P_H$. In some embodiments, the refined horizontal prediction value $P'_H$ is used for the current sample prediction (e.g., corresponding to a SMOOTH-H mode). In some embodiments, a vertical prediction value $P_V$ is derived, then a refined horizontal prediction value $P'_V$ is derived using a weighted sum of a top reference sample (e.g., the reference sample with the same horizontal coordinate) and $P_V$. In some embodiments, the refined vertical prediction value $P'_V$ is used for the current sample prediction (e.g., corresponding to a SMOOTH-V mode). In some embodiments, a combined (final) prediction value P is derived as a weighted sum of $P'_H$ and $P'_V$. In some embodiments, the combined prediction value P is used for the current sample prediction (e.g., corresponding to a SMOOTH-B mode).

In some embodiments, the horizontal prediction value $P_H$ is derived using a weighted sum of a left reference sample and one or more top (and/or top-right) reference samples. For example, the weighted sum may be based on a bilinear interpolation filtering. In some embodiments, the vertical prediction value $P_V$ is derived using a weighted sum of a top reference sample and one or more left (and/or bottom-left) reference samples. For example, the weighted sum may be based on a bilinear interpolation filtering. In some embodiments, the left and above reference samples are filtered before generating $P_H$ and/or $P_V$ values. For example, the left and above reference samples may be filtered with smooth filters, such as a Gaussian filter or a bilateral filter, before generating the $P_H$ and $P_V$ values, where the coefficients of the smooth filters are non-negative integers.

In some embodiments, the refined horizontal prediction value $P'_H$ is derived using Equation 4 below.

Refined Horizontal Prediction Value $$P'_H = (w_L \cdot L + (N - w_L) \cdot P_H + r)/N \qquad \text{Equation 4}$$

where L is a left or bottom left sample, $w_L$ is derived using the horizontal coordinate value of the current sample, N is a predefined value (e.g., an integer that is a power of 2, such as 2, 4, 8, 16, 32, 64, 128, 256, 512, or 1024), and r is a rounding offset (e.g., equal to 0.5·N). In some embodiments, $w_L$ is derived as $K>>((x<<1)>>s)$, where K is a predefined value (e.g., 16, 32 or 64), x is the horizontal coordinate of current sample to be predicted, s is a scaling factor based on the block size (e.g., s is equal to (log 2(W)+log 2(H)+2) >>2), and W and H are the block width and height, respectively.

In some embodiments, the refined vertical prediction value $P_V'$ is derived using Equation 5 below.

Refined Vertical Prediction Value $$P'_V = (w_T \cdot T + (N - w_T) \cdot P_V + r)/N \qquad \text{Equation 5}$$

where T is a top or top right sample, $w_T$ is derived using the vertical coordinate value of the current sample. In some embodiments, $w_T$ is derived as $K>>((y<<1)>>s)$, where y is the vertical coordinate of current sample to be predicted.

In some embodiments, the combined (final) prediction value P is derived as the average of $P_H'$ and $P_V'$. In some embodiments, P is derived as a weighted average of $P'_H$ and $P'_V$, where the weights depend on the block width and height.

In some embodiments, the new modes discussed above are applied together with the SMOOTH, SMOOTH-V, and SMOOTH-H modes of AV1 (e.g., corresponding to Equations 1-3). In some embodiments, the new modes discussed above replace the SMOOTH, SMOOTH-V, and SMOOTH-H modes of AV1. In some embodiments, the new modes discussed above are signaled as an additional mode. For example, the mode may be a new mode in the intra mode list. In another example, the mode may be signaled under the SMOOTH-B, SMOOTH-V, and SMOOTH-H modes. For example, a smooth mode index may be signaled to indicate if the new mode or a preexisting mode is used.

Note that having division operations (and/or right shift operations) in intermediate steps can reduce accuracy (e.g., the decimals are truncated due to the number of bits used to store the result of the division operation). Thus, performing a division operation when calculating $P_H$ and/or $P_V$ prior to calculating $P'_H$ and/or $P'_V$ may cause $P'_H$ and/or $P'_V$ to be less accurate. Therefore, it is advantageous to move the division operations to the end of the process (e.g., to the final step in calculating $P'_H$, $P'_V$, or P). Additionally, calculating the intermediate values without performing division can simplify the hardware logic needed to implement the calculations.

In some embodiments, when calculating the prediction samples for a new SMOOTH-B mode (or blend mode), the division (and/or right shift) operations are moved to the last derivation step. For example, a SMOOTH-B mode is calculated as shown in Equations 6-8 below, where L is a left or bottom left sample and T is a top or top right sample.

Division-free Refined Horizontal Prediction Value $$P'_H = (w_L \cdot L + (N - w_L) \cdot P_H) \qquad \text{Equation 6}$$

Division-free Refined Vertical Prediction Value $$P'_V = (w_T \cdot T + (N - w_T) \cdot P_V) \qquad \text{Equation 7}$$

Combined Prediction Value $$P = (P'_H + P'_V + r)/(2 \cdot N) \qquad \text{Equation 8}$$

In some embodiments, the division (and/or right shift) operations in calculating $P_H$ and $P_V$ are also moved to the last derivation step for the combined (final) predictor as shown in Equations 9-13 below. For example, during the internal calculation, a common value may be multiplied in to make each predictor have the same divider (or shift value).

Vertical Prediction Value $$P_V = (T \cdot (H - 1 - y) + BL \cdot (y + 1)) \cdot W \qquad \text{Equation 9}$$

Division-free Refined Vertical Prediction Value $$P'_V = (w_T \cdot W \cdot H \cdot T + (N - w_T) \cdot P_V) \qquad \text{Equation 10}$$

Horizontal Prediction Value $$P_H = (L \cdot (W - 1 - x) + TR \cdot (x + 1)) \cdot H \qquad \text{Equation 11}$$

Division-free Refined Horizontal Prediction Value $$P'_H = (w_L \cdot W \cdot H \cdot L + (N - w_L) \cdot P_H) \qquad \text{Equation 12}$$

Combined Prediction Value $$P = (P'_H + P'_V + r)/(2 \cdot N \cdot W \cdot H) \qquad \text{Equation 13}$$

In Equations 9-13, r is a rounding offset (e.g., equal to N·W·H). In Equations 9-13, the multiplication of W or H may be a left shift by the $\log_2(W)$ or $\log_2(H)$, and the division of (2·N·W·H) may be a right shift of $(1+\log_2(W)+\log_2(H)+\log_2(N))$. In Equations 9-13, the intermediate values (e.g., $P_V$, $P'_V$, $P_H$, and $P'_H$) are performed without a division or right shift operation.

In some embodiments, when calculating $P_H$, $P'_H$, $P_V$, and/or $P'_V$, a first right shift value is performed at the end of the respective calculation, and a second right shift operation is performed in the calculation of P (e.g., to compensate for the first right shift) as shown in Equations 14-18 below, where BL is a below left reference sample and TR is a top right reference sample.

Vertical Prediction Value with Shift $$P_V = ((T \cdot (H - 1 - y) + BL \cdot (y + 1)) \cdot W + r_{V1}) \gg s_{V1} \qquad \text{Equation 14}$$

Refined Vertical Prediction Value with Shift $$P'_V = ((w_T \cdot W \cdot H \cdot T + (N - w_T) \cdot P_V) + r_{V2}) \gg s_{V2} \qquad \text{Equation 15}$$

Horizontal Prediction Value with Shift $$P_H = ((L \cdot (W - 1 - x) + TR \cdot (x + 1)) \cdot H + r_{H1}) \gg s_{H1} \qquad \text{Equation 16}$$

Refined Horizontal Prediction Value with Shift $$P'_H = ((w_L \cdot W \cdot H \cdot L + (N - w_L) \cdot P_H) + r_{H2}) \gg s_{H2} \qquad \text{Equation 17}$$

Combined Prediction Value with Shift $$P = ((P'_H/(2 \cdot N \cdot W \cdot H/2^{s_{H1}+s_{H2}})) + \\ (P'_V/(2 \cdot N \cdot W \cdot H/2^{s_{V1}+s_{V2}})) + 1) \gg 1 \qquad \text{Equation 18}$$

In some embodiments, (e.g., if $s_{V1}+s_{V2}$ is equal to $s_{H1}+s_{H2}$) the final prediction P is derived by weighted average of $P_H$ and $P_V$ as shown in Equation 19 below:

Combined Prediction Value $$P = (P'_H + P'_V + r)/(2 \cdot N \cdot W \cdot H/2^{s_{V1}+s_{V2}}) \qquad \text{Equation 19}$$

where r is a rounding offset with example value as N·W·H/$2^{s_{V1}+s_{V2}}$.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a first block, where the first block is to be encoded in a smooth mode; (ii) identifying a set of reference samples for the first block; (iii) deriving a first prediction value for the first block, where the first prediction value is derived via a linear interpolation function involving a first reference sample of the set of reference samples and a height and a width of the first block; and (iv) encoding the first block based on the first prediction value. In some embodiments, the linear interpolation function does not include a division or shift operation. For example, the smooth mode is a SMOOTH-H mode, a SMOOTH-V mode, or a combined (SMOOTH-B) mode.

(A2) In some embodiments of A1, the method further includes: (i) deriving a refined first prediction value for the first block; and (ii) encoding the first block based on the refined first prediction value. In some embodiments, the refined first prediction value is derived without a division or shift operation.

(A3) In some embodiments of A2, the method further includes: (i) deriving a second prediction value for the first block, where the second prediction value is derived via a second linear interpolation function involving a second reference sample of the set of reference samples and the height and the width of the first block; (ii) deriving a refined second prediction value for the first block; and (iii) deriving a combined prediction value using the refined first prediction value and the refined second prediction value, where the first block is encoded using the combined prediction value. In some embodiments, the second linear interpolation function does not include a division or shift operation. In some embodiments, the combined prediction value, P, is derived using a division operation.

(A4) In some embodiments of any of A1-A3, the first prediction value is a horizontal prediction value, $P_H$, and the first interpolation function implements Equation 11.

(A5) In some embodiments of any of A1-A3, first prediction value is a vertical prediction value, $P_V$, and the first interpolation function implements Equation 9.

(A6) In some embodiments of any of A1-A5, deriving the first prediction value for the first block includes performing a right shift operation.

(A7) In some embodiments of any of A1-A6, the method further includes transmitting the encoded first block via a video bitstream.

(B1) In another aspect, some embodiments include a method of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a first block, from a video bitstream, where the first block is encoded in a smooth mode; (ii) identifying a set of reference samples for the first block; (iii) deriving a first prediction value for the first block, where the first prediction value is derived via a linear interpolation function involving a first reference sample of the set of reference samples and a height and a width of the first block; and (iv) decoding the first block based on the first prediction value.

(B2) In some embodiments of B1, the linear interpolation function does not include a division or shift operation. For example, all division and/or shift operations are performed only in a final prediction value derivation.

(B3) In some embodiments of B1 or B2, the method further includes: (i) deriving a refined first prediction value for the first block; and (ii) decoding the first block based on the refined first prediction value. In some embodiments, the refined first prediction value is derived using a weighted sum of the first reference sample of the set of reference samples and the first prediction value. In some embodiments, deriving the refined first prediction value includes performing a shift right operation. For example, $P'_V$ and $P'_H$ are derived using Equations 15 and 17, where $s_{V2}$ and $s_{H2}$ are shift right values.

(B4) In some embodiments of B3, the refined first prediction value is derived without a division or shift operation. For example, the first prediction value is a horizontal prediction value and the refined first prediction value is derived using Equation 6 or Equation 12.

(B5) In some embodiments of B3 or B4, the method further includes: (i) deriving a second prediction value for the first block, where the second prediction value is derived via a second linear interpolation function involving a second reference sample of the set of reference samples and the height and the width of the first block; (ii) deriving a refined second prediction value for the first block; and (iii) deriving a combined prediction value using the refined first prediction value and the refined second prediction value, where the first block is decoded using the combined prediction value. In some embodiments, the refined second prediction value is derived using a weighted sum of the second reference sample of the set of reference samples and the second prediction value. In some embodiments, deriving the second prediction value for the first block includes performing a right shift operation. For example, $P_V$ is derived using Equation 14 and $P_H$ is derived using Equation 16 where $s_{V1}$ and $s_{H1}$ are shift right values. In some embodiments, the combined prediction value is derived using Equation 18. In some embodiments, $s_{V1}+s_{V2}$ is equal to $s_{H1}+s_{H2}$ and the combined prediction, P, is derived by weighted average of $P_H$ and $P_V$. For example, P is derived using Equation 19 where r is a rounding offset with example value as $N \cdot W \cdot H / 2^{s_{V1}+s_{V2}}$.

(B6) In some embodiments of B5, the second linear interpolation function does not include a division or shift operation. As an example, the second prediction value is a vertical prediction value and the refined second prediction value is derived using Equation 7 or Equation 10.

(B7) In some embodiments of B5 or B6, the combined prediction value, P, is derived using a division operation. For example, P is derived using Equation 8 or Equation 13.

(B8) In some embodiments of any of B1-B7, the first prediction value is a horizontal prediction value, $P_H$, and the first interpolation function implements Equation 11: $P_H = (L \cdot (W-1-x)+TR \cdot (x+1)) \cdot H$. In this function, L is a left reference sample, W is a width of the first block, TR is a top right reference sample, H is a height of the first block, and x is a horizontal coordinate of the sample to be predicted.

(B9) In some embodiments of any of B1-B7, first prediction value is a vertical prediction value, $P_V$, and the first interpolation function implements Equation 9: $P_V = (T \cdot (H-1-y)+BL \cdot (y+1)) \cdot W$. In this function, T is a top reference sample, W is a width of the first block, BL is a bottom left reference sample, H is a height of the first block, and y is a vertical coordinate of the sample to be predicted.

(B10) In some embodiments of any of B1-B9, deriving the first prediction value for the first block includes performing a right shift operation. For example, the first prediction value is a horizontal prediction value, $P_H$, and is derived using Equation 16. As another example, the first prediction value is a vertical prediction value, $P_V$, and is derived using Equation 14.

(C1) In another aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a first block, from a video bitstream, where the first block is encoded in one of a plurality of smooth modes; (ii) identifying a set of reference samples for the first block; (iii) deriving a first prediction value (e.g., a combined prediction value) for the first block, where the first prediction value is derived from a second prediction value (e.g., a refined prediction value), where the second prediction value is derived without a division or shift operation, and where a final step in deriving the first prediction value comprises a division or shift operation; and (iv) decoding the first block using the first prediction value.

(C2) In some embodiments of C1, the second prediction value is a refined prediction value derived (e.g., using Equation 10, 12, 15, or 17) from a third prediction value (e.g., a horizontal or vertical prediction value), and the third prediction value is derived without a division or shift operation.

(C3) In some embodiments of C2, the third prediction value is derived via a linear interpolation function involving a first reference sample of the set of reference samples and a height and a width of the first block.

(C4) In some embodiments of C3, the third prediction value is a horizontal prediction value, $P_H$, and the linear interpolation function is defined by Equation 11.

(C5) In some embodiments of C3, the third prediction value is a vertical prediction value, $P_V$, and the linear interpolation function is defined by Equation 9.

(C6) In some embodiments of any of C1-05, the method further comprising deriving a fourth prediction value for the first block (e.g., using Equation 10, 12, 15, or 17), where the first prediction value is derived from a combination of the second prediction value (e.g., a horizontal prediction value) and the fourth prediction value (e.g., a vertical prediction value) (e.g., using Equation 13, 18, or 19).

(C7) In some embodiments of C6, the fourth prediction value is derived without a division or shift operation.

(C8) In some embodiments of C6 or C7, the fourth prediction value is a refined prediction value derived from a fifth prediction value (e.g., a horizontal or vertical prediction value).

(C9) In some embodiments of C8, the fifth prediction value is derived via a second linear interpolation function involving a second reference sample of the set of reference samples and a height and a width of the first block.

(C10) In some embodiments of C9, the second linear interpolation function does not include a division or shift operation.

(C11) In some embodiments of any of C1-C10, deriving the first prediction value for the first block includes performing a right shift operation (e.g., using Equation 18).

(C12) In some embodiments of any of C1-C11, the first prediction value is derived using Equation 13.

(C13) In some embodiments of any of C1-C11, the first prediction value is derived using Equation 18 or Equation 19.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A7, B1-B10, and C1-C13 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A7, B1-B10, and C1-C13 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving video data comprising a plurality of blocks, including a first block, from a video bitstream, wherein the first block is encoded in one of a plurality of smooth modes;

identifying a set of reference samples for the first block;

deriving a first prediction value for the first block, wherein the first prediction value is derived from a second prediction value, wherein the second prediction value is derived without a division or shift operation, and wherein a final step in deriving the first prediction value comprises a division or shift operation;

wherein, when the first block is encoded in a horizontal smooth mode, the second prediction value, P2, is derived according to $P2=(L \cdot (W-1-x)+TR \cdot (x+1) \cdot H$, wherein W is a width of the first block, H is a height of the first block, L is a left reference sample from a location that is left of the first block, and TR is top-right reference sample from a location that is top right of the first block; and wherein, when the first block is encoded in a vertical smooth mode, the second prediction value, P2, is derived according to $P2=(T \cdot (H-1-y)+BL \cdot (y+1)) \cdot W$, wherein T is a top reference sample from a location that is above the first block, and BL is bottom-left reference sample from a location that is bottom left of the first block; and decoding the first block using the first prediction value.

2. The method of claim 1, further comprising deriving a fourth prediction value for the first block, wherein the first prediction value is derived from a combination of the second prediction value and the fourth prediction value.

3. The method of claim 2, wherein the fourth prediction value is derived without a division or shift operation.

4. The method of claim 2, wherein the fourth prediction value is a refined prediction value derived from a fifth prediction value.

5. The method of claim 4, wherein the fifth prediction value is derived via a second linear interpolation function involving a second reference sample of the set of reference samples and a height and a width of the first block.

6. The method of claim 5, wherein the second linear interpolation function does not include a division or shift operation.

7. The method of claim 1, wherein deriving the first prediction value for the first block includes performing a right shift operation.

8. The method of claim 1, wherein the first prediction value, P, is derived using $P=(P'_H+P'_V+r)/(2 \cdot N \cdot W \cdot H)$, wherein $P'_H$ is a horizontal prediction value, $P'_V$ is a vertical prediction value, r is a rounding offset, and N is a predefined value.

9. The method of claim 1, wherein the first prediction value, P, is derived using $P=(P'_H+P'_V+r)/(2 \cdot N \cdot W \cdot H \cdot 2^{s_{V1}+s_{V2}})$, wherein $P'_H$ is a horizontal prediction value, $P'_V$ is a vertical prediction value, r is a rounding offset, N is a predefined value, $s_{V1}$ is a first shift value, and $s_{V2}$ is a second shift value.

10. The method of claim 1, further comprising deriving a refined prediction value from the second prediction value, wherein the refined prediction value is derived without a division or shift operation, and wherein the first prediction value is derived from the refined prediction value.

11. The method of claim 10, wherein the refined prediction value is derived via a linear interpolation function involving a first reference sample of the set of reference samples and a height and a width of the first block.

12. A method of video encoding performed at a computing system having memory and one or more processors, the method comprising:

receiving video data comprising a plurality of blocks, including a first block, wherein the first block is to be encoded in one of a plurality of smooth modes;

identifying a set of reference samples for the first block;

when the first block is to be encoded in a horizontal smooth mode, a first prediction value, P, is derived according to $P=(L \cdot (W-1-x)+TR \cdot (x+1)) \cdot H$, wherein W is a width of the first block, H is a height of the first block, L is a left reference sample from a location that is left of the first block, and TR is top-right reference sample from a location that is top right of the first block;

when the first block is to be encoded in a vertical smooth mode, the first prediction value, P, is derived according to $P=(T \cdot (H-1-y)+BL \cdot (y+1)) \cdot W$, wherein T is a top reference sample from a location that is above the first block, and BL is bottom-left reference sample from a location that is bottom left of the first block;

deriving a second prediction value for the first block, wherein the second prediction value is derived using the first prediction value, and wherein a final step in deriving the second prediction value comprises a division or shift operation; and encoding the first block using the second prediction value.

13. The method of claim 12, further comprising deriving a refined prediction value from the first prediction value, wherein the refined prediction value is derived without a division or shift operation, and wherein the second prediction value is derived from the refined prediction value.

14. The method of claim 13, wherein the refined prediction value is derived via a linear interpolation function involving a first reference sample of the set of reference samples and a height and a width of the first block.

15. The method of claim 12, further comprising deriving a fourth prediction value for the first block, wherein the second prediction value is derived from a combination of the first prediction value and the fourth prediction value.

16. The method of claim 12, wherein deriving the second prediction value for the first block includes performing a right shift operation.

17. A method of processing visual media data, the method comprising:

obtaining a source video sequence that comprises a plurality of frames; and performing a conversion between the source video sequence and a video bitstream of visual media data according to a format rule;

wherein the video bitstream comprises a plurality of blocks, including a first block encoded in one of a plurality of smooth modes;

wherein the format rule specifies that:

a set of reference samples are to be identified for the first block;

when the first block is encoded in a horizontal smooth mode, a first prediction value, P, is to be derived according to $P=(L \cdot (W-1-x)+TR \cdot (x+1)) \cdot H$, wherein W is a width of the first block, H is a height of the first block, L is a left reference sample from a location that is left of the first block, and TR is top-right reference sample from a location that is top right of the first block;

when the first block is encoded in a vertical smooth mode, the first prediction value, P, is to be derived according to $P=(T \cdot (H-1-y)+BL \cdot (y+1)) \cdot W$, wherein T is a top reference sample from a location that is above the first block, and BL is bottom-left reference sample from a location that is bottom left of the first block;

a second prediction value is to be derived for the first block, the second prediction value being derived from the first prediction value, wherein a final step in deriving the second prediction value comprises a division or shift operation; and the first block is to be decoded using the second prediction value.

18. The method of claim 17, wherein the format rule further specifies that a refined prediction value is to be derived from the first prediction value, wherein the refined prediction value is derived without a division or shift operation, and wherein the second prediction value is derived from the refined prediction value.

19. The method of claim 18, wherein the refined prediction value is derived via a linear interpolation function involving a first reference sample of the set of reference samples and a height and a width of the first block.

20. The method of claim 17, wherein the format rule further specifies that a fourth prediction value is to be derived for the first block, wherein the second prediction value is derived from a combination of the first prediction value and the fourth prediction value.

* * * * *